April 2, 1940. C. L. EKSERGIAN 2,195,590
WHEEL MOUNTING
Filed Jan. 26, 1938 2 Sheets-Sheet 1
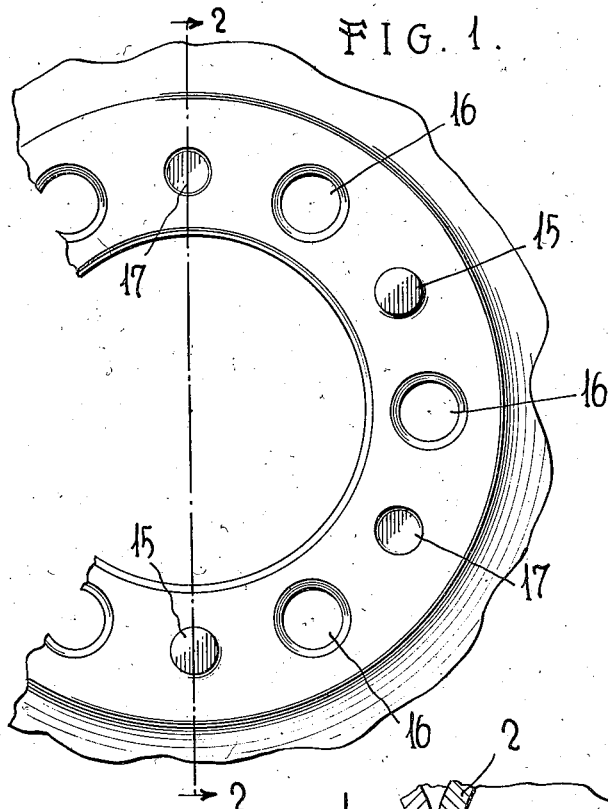
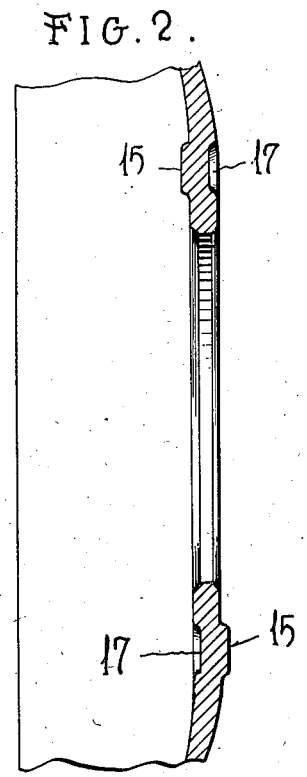
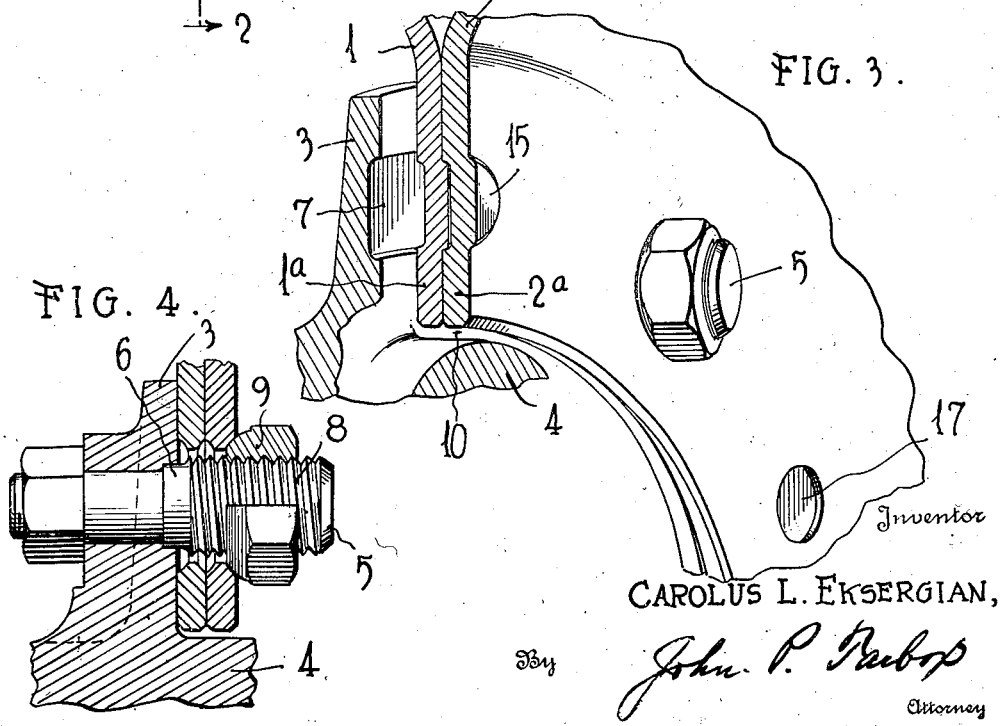
Inventor
CAROLUS L. EKSERGIAN,
By John P. Barbop
Attorney April 2, 1940.   C. L. EKSERGIAN   2,195,590
WHEEL MOUNTING
Filed Jan. 26, 1938   2 Sheets-Sheet 2
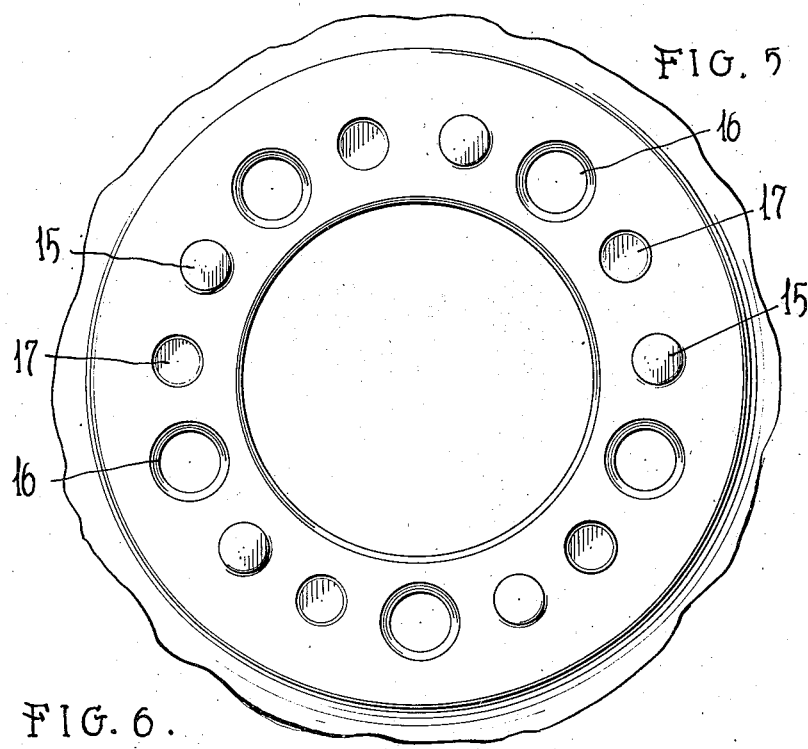
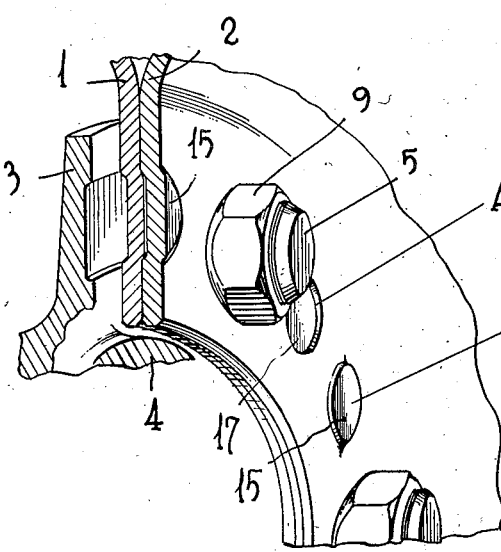
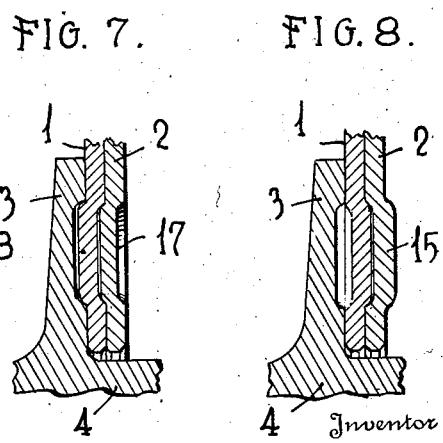
CAROLUS L. EKSERGIAN,
Inventor
By John P. Tarbox
Attorney Patented Apr. 2, 1940

2,195,590

UNITED STATES PATENT OFFICE 2,195,590

WHEEL MOUNTING

Carolus L. Eksergian, Detroit, Mich., assignor to Budd Wheel Company, Philadelphia, Pa., a corporation of Pennsylvania Application January 26, 1938, Serial No. 186,933

5 Claims. (Cl. 301—36)

This invention relates to vehicle wheels and more particularly to demountable dual wheel constructions for motor vehicles.

The invention consists in providing a dual wheel construction with detachable annular wheel bodies adapted to carry on their outer peripheries the tires, and adapted to be detachably connected near their inner peripheries to the hub of the wheel.

The wheel bodies are preferably made of resilient metal, such as steel, and are dished axially so as not only to secure a suitable resiliency of the metal bodies against axial strains, but also to enable the wheel bodies carrying the tires, to be mounted in pairs, side by side, on the same hub of a wheel, if desired. The wheel discs are detachably connected to the hub by suitable fastening devices, such as bolts or studs and nuts, so that the wheel discs either with or without the tires thereon, may be readily applied to or removed from the hub of the wheel.

More particularly, the present invention is concerned with a dual wheel construction of this kind and has for its object to provide means by which the inner wheel body may be quickly and accurately positioned and centered while the outer wheel body is being centered when the nuts on the bolts or studs are tightened.

Another object is to provide a dual wheel mounting in which the wheel discs are embossed between the bolt or stud holes, alternately in opposite directions, so that when the two wheel discs are assembled on the wheel hub, the embossment on one wheel disc fits within the depression on the other wheel disc, thus locking the two discs together and centering the inner wheel disc on the outer wheel disc.

The invention will be more fully understood after reference to the accompanying drawings, in which like parts are indicated by similar reference symbols throughout the several views, and in which:

Figure 1 shows a partial side elevation of a wheel construction embodying one form of the invention;

Figure 2 is a cross-section on the line 2—2 of Figure 1;

Figure 3 is a partial perspective view of the wheel construction, showing the relation of the wheel bodies to the hub structure;

Figure 4 is a partial cross-section taken through the bolt shown in Figure 3;

Figure 5 is a partial side elevation of a wheel construction embodying a modification of the invention;

Figure 6 is a partial perspective view of the wheel construction shown in Figure 5, showing the relation of the wheel bodies to the hub structure;

Figure 7 is a cross-section taken through the wheel discs at A of Figure 6; and

Figure 8 is a cross-section taken through the wheel discs at B of Figure 6.

Throughout the description it is intended that the inner wheel body denote that body which is axially innermost of the dual wheel assembly. It is that wheel body which lies adjacent to the hub flange, and might also be termed the inboard wheel body. The term outer wheel body denotes that body which is axially outermost of the dual wheel assembly.

As illustrated, 1 and 2 are respectively the inner and outer wheel bodies forming the dual wheel assembly. They are disc wheels, each preferably formed in the same manner as the other to be interchangeable. They are each dished axially throughout a portion of their bodies and are planar in their portions 1a and 2a, the better to enable them to be mounted in pairs, side by side, on the same hub.

Referring more particularly to Figures 3 and 4, the wheel discs 1 and 2, shown only partially, are mounted adjacent to the flange 3 of the wheel hub 4. The flange is annular and is preferably formed integrally with the hub. In Figure 4, large bodied studs 5 are mounted on a common bolt or stud circle, as appears more clearly in Figure 1, and are secured to the hub flange in a way common to the art. They are kept from turning in the hub flange by means of the portion 6 which fits in the groove portion 7 of the hub flange. These mechanical expedients form no part of this invention. The stud or bolt 5 is threaded at 8, upon which threads is placed the securing nut 9.

Each wheel disc is provided with a central opening through which the hub 4 extends in spaced relation to said wheel discs. It is to be particularly noted that the hub 4 does not serve as a wheel-center seat, but that there is deliberately provided a sufficient clearance 10 so that at all times, the wheel discs are spaced from the hub. The preservation of this space is important in that, from a manufacturing standpoint, it is impossible to hold dimensions so closely that the wheel bodies would not ride either on the hub or on the studs and hub. In the construction shown herein, the wheel discs are entirely free of the hub barrel and ride solely upon the studs and nuts. As shown in Figures 3 and 6, the studs are all alike.

Coming now to the gist of the invention, and viewing Figure 1 in particular, each disc is embossed as at 15 between the bolt holes 16 alternately in opposite directions; that is, the embossments are placed on the same circle comprehending the bolt holes and with respect to any two adjacent bolt holes, the embossments are centered with respect thereto. In section, the embossments appear more clearly in Figure 2. It is apparent that the embossment, created by pressing the metal of the disc, also creates a depression 17. Each disc is embossed in an identical manner.

The inner wheel disc is mounted by placing it over the studs through the provision of a plurality of concave sockets or bolt holes 16, centrally perforated and positioned at equal distances from the center of the disc. The outer wheel disc is provided with perforations identical to those of the inner wheel disc and the same is mounted by placing it over the studs or bolts 5 so that the wheel discs abut in the region of the stud or bolt circle. It is to be noted that the embossment on one disc fits within the depression on the other disc, thus locking the two discs together and centering the inner disc on the outer disc. The outer disc is centered by tightening the single securing nut 9. After all of the nuts are tightened, the discs are firmly locked together and centered. The embossment might also be termed a projection, having behind it a complemental depression. The construction shown in Figure 1, employing six studs or bolts is more particularly for heavier truck wheels and the like.

The modification, shown in Figure 5, is more particularly for lighter vehicles and employs five studs or bolts. Between the bolt holes are placed embossments 15, 15, there being a pair of them or a total number of embossments double the number of bolt holes. As to each pair of embossments it is to be noted that each embossment of each pair is oppositely directed, as appears more clearly in Figure 6. Further, these embossments are equally spaced on centers between the centers of the bolt holes 16. Figures 7 and 8 show clearly in what manner the discs are centered and locked together, by means of the embossments.

The construction shown assures perfect alignment of both wheel discs and gives an added assurance of strength.

It is to be understood, however, that the description and drawings are for the purpose of illustration and example only, and are not to be taken as limiting the scope of this invention. Such limitation is to be only by the prior art, and by the terms of the appended claims.

I claim:

1. A vehicle wheel comprising a hub having an annular flange having a groove in its outer face, a plurality of screw-threaded bolts carried by said flange, a pair of annular dished wheel discs, each provided with a central opening through which the hub extends in spaced relation to said wheel discs and a plurality of concave sockets centrally perforated and positioned at equal distances from the center of said disc and having shallow imperforate embossments arranged on centers equally spaced with respect to said concave sockets and extending alternately in opposite directions, said discs being reversely mounted with respect to said hub with said bolts extending through said perforations and with the convex portions of the embossments on one wheel disc fitting within the concave portions of the embossments on the other wheel disc, the innermost wheel disc being centered with respect to the hub by engagement of certain of said embossments in said hub flange groove and with respect to said outer wheel disc and locked thereto by means of said embossments, and means for detachably connecting said wheel discs to said hub comprising nuts threaded on said bolts and being provided with convex bosses engaging in the concave sockets of the outer wheel disc.

2. A vehicle wheel comprising a hub having an annular flange having a groove in its outer face, a plurality of screw-threaded bolts carried by said flange, a pair of annular dished wheel discs, each provided with a central opening through which the hub extends in spaced relation to said wheel discs and a plurality of concave sockets centrally perforated and positioned at equal distances from the center of said disc having on centers equally spaced with respect to said concave sockets alternately oppositely disposed shallow imperforate projections and depressions, said discs being reversely mounted with respect to said hub with said bolts extending through said perforations and with the projections on one wheel disc fitting within the depressions on the other wheel disc, the innermost wheel disc being centered with respect to said hub by engagement of certain of said projections in said hub flange groove and with respect to said outer wheel disc and locked thereto by means of said projections and depressions, and means for detachably connecting said wheel discs to said hub comprising nuts threaded on said bolts and being provided with convex bosses engaging in the concave sockets of the outer wheel disc.

3. A vehicle wheel comprising a hub having an annular flange having a groove in its outer face a plurality of screw-threaded bolts carried by said flange, a pair of annular dished wheel discs, each provided with a central opening through which the hub extends in spaced relation to said wheel discs and a plurality of concave sockets centrally perforated and positioned at equal distances from the center of said disc and having shallow imperforate embossments of double the number of said concave sockets arranged on centers equally spaced with respect to said concave sockets, the embossments between each pair of concave sockets extending alternately in opposite directions, said discs being reversely mounted with respect to said hub with said bolts extending through said perforations and with the convex portions of the embossments on one wheel disc fitting within the concave portions of the embossments on the other wheel disc, the innermost wheel disc being centered with respect to said hub by the engagement of certain of its embossments in said hub flange groove and with respect to said outer wheel disc by means of said embossments, and means for detachably connecting said wheel discs to said hub comprising nuts threaded on said bolts and being provided with convex bosses engaging in the concave sockets of the outer wheel disc.

4. A vehicle wheel comprising a hub having an annular flange having portions offset from its outer face, a plurality of screw-threaded bolts carried by said flange, a pair of annular dished wheel discs, each provided with a central opening through which the hub extends in spaced relation to said wheel discs and a plurality of concave sockets centrally perforated and positioned at equal distances from the center of said disc having, arranged on centers equally spaced with respect to said concave sockets, a pair of oppositely directed shallow imperforate formations, one being a projection and the other a depression, said discs being reversely mounted with respect to said hub with said bolts extending through said perforations and with the projections on one wheel disc fitting within the depressions on the other wheel disc, the innermost wheel disc being centered with respect to said hub by engagement of certain of said projections in the offset portions from the face of the hub flange and with respect to said outer wheel disc by means of said projections and depressions when the wheels are secured to the hub, and means for detachably connecting said wheel discs to said hub comprising nuts threaded on said bolts and being provided with convex bosses engaging in the concave sockets of the outer wheel disc.

5. In a vehicle wheel, a hub, an annular radial flange on said hub having portions offset from its outer face, a pair of wheel bodies, a single annular series of axially extending threaded fastening devices, shallow imperforate embossments on said wheel bodies equally spaced with and in the same radial zone with said axially extending fastening devices and alternately disposed in opposite directions for centering and supporting both wheel bodies free and clear of said hub and centering both wheel bodies with respect to said flange with the inwardly projecting embossments on the inner wheel body located in the portions offset from the outer face of the hub flange, said fastening devices being connected with said flange, and nuts screwed on the ends of said fastening devices to clamp said wheel bodies against said flange.

CAROLUS L. EKSERGIAN.